United States Patent [19]

Sansone

[11] Patent Number: 4,863,419

[45] Date of Patent: Sep. 5, 1989

[54] CONVEYOR AND/OR ACCOMPANYING BELT

[75] Inventor: Giorgio Sansone, Genoa, Italy

[73] Assignee: FIRIE di Giorgio Sansone S.A.S., Genoa, Italy

[21] Appl. No.: 273,100

[22] Filed: Nov. 18, 1988

[51] Int. Cl.⁴ .............................................. F16G 1/00
[52] U.S. Cl. .................................... 474/237; 198/848
[58] Field of Search ...................... 474/237, 266–268; 198/804–806, 836, 848, 844, 847

[56] References Cited

U.S. PATENT DOCUMENTS

| | | | |
|---|---|---|---|
| 1,262,745 | 4/1918 | Buck | 198/848 X |
| 2,748,044 | 5/1956 | Seiler | 474/237 X |
| 4,772,253 | 9/1988 | Koizumi et al. | 474/266 |
| 4,792,324 | 12/1988 | Whitaker | 474/237 |

Primary Examiner—Thuy M. Bui
Attorney, Agent, or Firm—Larson and Taylor

[57] ABSTRACT

A belt (1), suitably closed into ring-shape and carried around at least two turn-round and/or driving cylinders (2, 3), is made of plastics material, particularly of polytetrafluoroethylene, or the like, or it is constituted by a fabric, particularly of glass, impregnated and/or coated with plastics material, particularly with polytetrafluoroethylene. Both longitudinal edges of the belt have an enlarged guiding bead (6) resting on the edge (4) of each end face of the turn-round cylinder and/or driving cylinder (2, 3) or on an annular step of said cylinder, or engaging into an annular groove in said cylinder. The enlarged guiding bead (6) may be constituted by a flexible core (5) incorporated within the respective longitudinal edge of the belt (1), and particularly enwrapped by a marginal portion (101) of the belt (1) which is folded over around the core (5) and is secured to said belt (1).

8 Claims, 1 Drawing Sheet

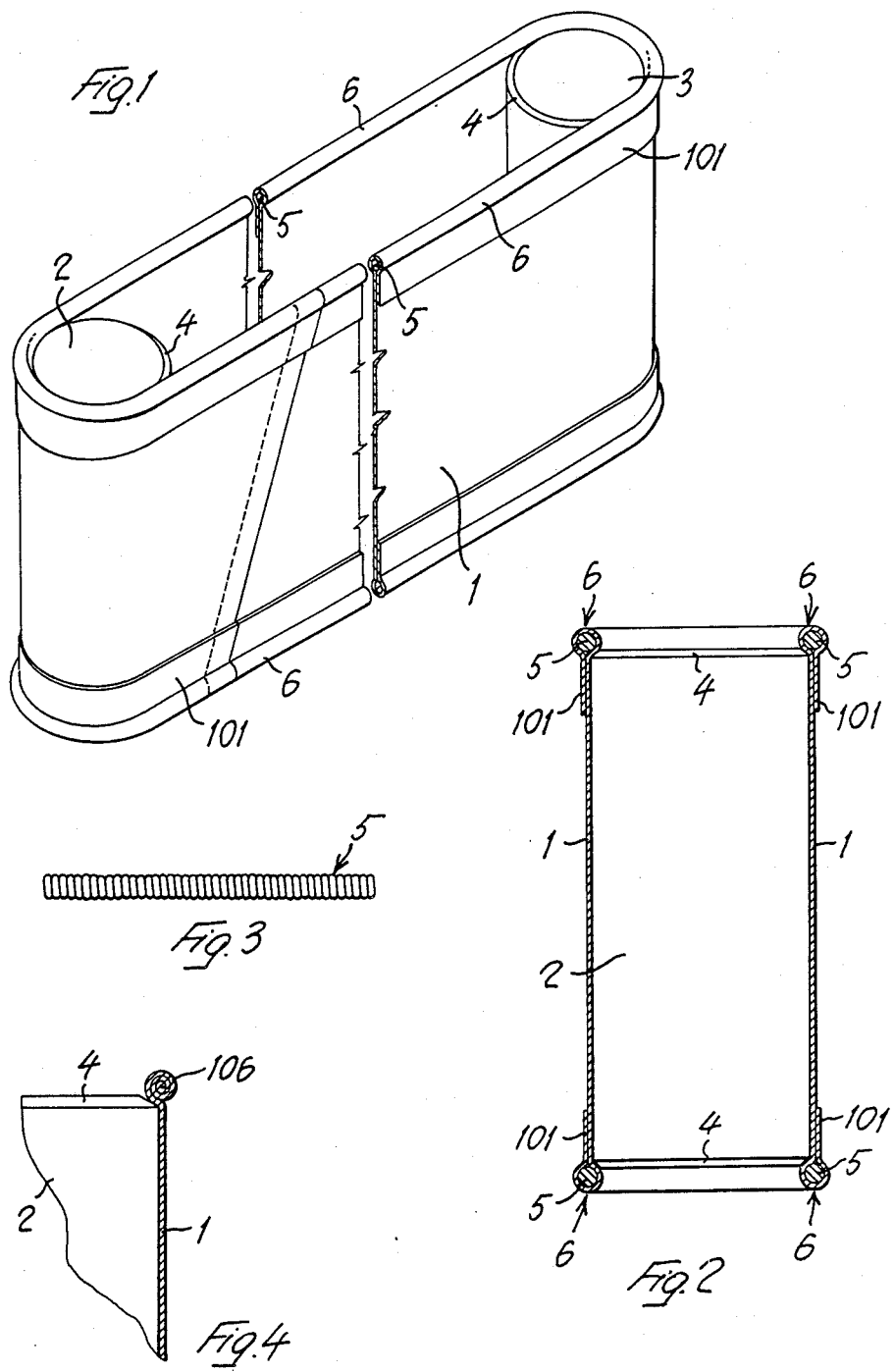

CONVEYOR AND/OR ACCOMPANYING BELT

SUMMARY OF THE INVENTION

This invention relates to endless belts carried on at least two turn-round and/or driving cylinders and made of plastics material, more particularly of polytetrafluoroethylene (PTFE, TFE) or the like, or made of a fabric of natural, mineral or synthetic fibres, particularly of glass, or the like, impregnated and/or coated with plastics material, particularly with polytetrafluoroethylene (PTFE, TFE), or the like.

Endless belts of this type may be used for any suitable purpose, for example, as conveyor belts, i.e. for supporting and conveying articles or materials, or as accompanying belts, i.e. for guiding and holding articles and materials being conveyed otherwise.

In a preferred type of use of said belts, the latter are used as so-called sealing belts. In this case, a sequence of articles to be sealed, e.g. a sequence of packages provided with heat-sealable wrappers, are passed between two facing, generally vertical stretches of two endless belts of the type specified above, which are actuated so that their facing stretches move in the same direction and at the same speed as the interposed articles to be sealed, thus moving along with them with no rubbing therebetween during their movement. During their passage between said belts, said articles are subjected, with the intermediary of said belts, first to a heat-sealing operation and then, if desired, to a cooling operation by means of heated plates and cooled plates, respectively, arranged at stationary positions on the outer sides of said facing stretches of the belts.

In a different application, conveyance and sealing are performed by one single endless belt operated by cylinders positioned horizontally.

Heretofore, in order to avoid any displacement of said belts with respect to their turn-round and driving cylinders, an edge of the belt, particularly the upper edge of a vertically-operating sealing belt, was reinforced by adhering a strip thereto, and at this reinforced marginal area the belt was provided with a longitudinal sequence of positioning pivots equally spaced from each other. These positioning pivots engaged into a corresponding annular groove formed in each of the belt turn-round and driving cylinders, thus preventing the belt from displacing axially of said cylinders. The application of said positioning pivots, however, requires time and labor and, therefore, increases the cost of said belts. Moreover, said positioning pivots add to the weight of the belt and require the use of turn-round and driving cylinders of particular construction, i.e. provided with at least one annular groove. Moreover, guiding profiles are necessary to support the belt along the stretches where said belt is running free over a straight path. The guiding or positioning pivots running on, or in, said profiles will cause a tiresome noise. The positioning pivots applied on the belt constitute points of structural discontinuity in the marginal area which, therefore, is liable to an increased risk of rupture.

The object of the invention is to overcome said disadvantages of the heretofore known belts and aims to simplify the construction of said type of belts and to reduce the cost and weight thereof, eliminating said structural discontinuity of the edge and rendering the construction of the turn-round and driving cylinders more simple and economical.

This problem is solved by the invention in that both longitudinal edges of the belt are thickened i.e. enlarged so as to form, each, a guiding or positioning bead.

Thus, an endless belt according to the invention may rest via the thicker i.e. enlarged guiding beads of its longitudinal edges on two associated annular steps formed on the turn-round and the driving cylinders or, more advantageously, on the edges of the two end surfaces of the turn-round and the driving cylinders, so as to prevent the belt from displacing axially on said cylinders, and at the same time to maintain said belt stretched in its transverse direction. This transverse stretching of the belt according to the invention, which can be obtained by virtue of the enlarged beads of its longitudinal edges, is particularly important and advantageous for said sealing belts, which should be as thin as possible (to permit a better transfer of heat), but at the same time should have no wrinkles or creases in order to ensure a perfect heat-sealing.

With the endless belts according to the invention, the turn-round and driving cylinders need not be provided with annular grooves and, in a favoured embodiment of the invention, may be thoroughly plain, the width of the belt and the length of its turn-round and driving cylinders being matched to each other so that the belt will rest by the enlarged guiding beads of its longitudinal edges against the edges of the two end surfaces of said cylinders.

At the same time, the enlargement of the longitudinal edges of the belts according to the invention, besides being obtainable easily and inexpensively, constitutes a considerable improvement as it avoids any discontinuity of edges which are more liable to risk of rupture. At the same time, stresses are distributed uniformly on both sides of the belt.

The bead-like enlargement of the longitudinal edges of the belt according to the invention may be obtained in any suitable manner. Thus, for example, according to an embodiment of the invention, each longitudinal edge of the belt may have incorporated therein a flexible core of any suitable material capable of resisting the tension and heat to which the belt is subjected, and constituted, for example, by a flexible plastics rod, a small string or cable of natural, synthetic or mineral fibres, particularly of glass, or by one or more wires, more particularly a coiled steel wire.

Said flexible cores may be incorporated into the respective longitudinal edges of the belt according to the invention in any suitable manner, for example, by folding over the longitudinal edge of the belt transversely to said belt around the respective core and by securing it to said belt, for example, by stitching and/or glueing and/or sealing.

The flexible cores may be incorporated into the longitudinal edges of the belt according to the invention either upon manufacturing it, or subsequently, before or after closing it into ring-shape i.e. endless belt configuration, or directly upon mounting it on the cylinders.

According to a preferred embodiment of the invention, each flexible core may be incorporated into the respective longitudinal edge of the belt according to the invention so as to be freely slidable longitudinally of the belt. This sliding freedom of said cores with respect to the belt will be advantageous to allow for different elongations of the cores and the belt due to thermal expansion or mechanical stresses. The belts according to the invention may be marketed and supplied to a user in the form of a simple continuous belt which is then closed into ring-shape and converted into an endless belt by either said user or by a workshop for preparing and mounting it. In this instance, the flexible cores to be incorporated into the longitudinal edges of the belt may be supplied separate from the belt, and subsequently they may be threaded each into a tubular recess formed in the corresponding longitudinal edge of the belt and obtained, for example, as specified above, i.e. by folding over the longitudinal edge of the belt transversely of said belt and by securing it in tubular shape to said belt. Of course, the flexible cores so threaded into the longitudinal edges of the belt may be then, if desired, unthreaded therefrom.

According to a further embodiment of the invention, the bead-like enlargement of the longitudinal edges of the belt may be obtained by rolling the respective longitudinal edge of the belt transversely to said belt and by securing the curled bead thus obtained in any suitable manner, for example, by glueing or sealing.

Said enlarged curl-shaped bead may also be obtained by rolling the respective longitudinal edge of the belt transversely of said belt around a core, more particularly around a flexible core, e.g. around a wire of any metal or any other suitable material, and said core may remain incorporated within said curl-shaped bead or it may be unthreaded after the formation of it so as to obtain a tubular bead.

BRIEF DESCRIPTION OF THE DRAWINGS

Some embodiments of the invention will be described hereinafter with reference to the accompanying drawing, wherein:

FIG. 1 is a perspective and partly sectional view of an endless belt according to the invention, mounted on two turn-round rollers.

FIG. 2 is an axial sectional view, on an enlarged scale, of one of the turn-round rollers of FIG. 1, and of the belt mounted around said cylinder.

FIG. 3 shows a possible embodiment where a flexible core is incorporated in the longitudinal edges of the belt.

FIG. 4 is a part sectional view similar to that of FIG. 2, showing the end edge of a turn-round cylinder, with another embodiment of the respective longitudinal enlarged edge of a belt.

DESCRIPTION OF THE PREFERRED EMBODIMENTS

With reference to the Figures, the numeral 1 indicates an endless belt which may be made of a sheet of any plastics material, particularly of polytetrafluoroethylene, or the like, or which may be made of a fabric of any material, particularly of glass fibres, or the like, impregnated and/or coated with any suitable plastics material, particularly with polytetrafluoroethylene, or the like. The belt 1 is mounted around at least two turn-round cylinders 2 and 3, one of which may be powered so as to act as a driving cylinder. The cylinders 2, 3 are of plain configuration, and they only have a bevelling 4 at their end edges.

In the illustrated embodiment, the axes of the two turn-round cylinders 2, 3 and therefore the planes of the two stretches of the belt 1, are substantially vertical, but obviously they may be, as an alternative, either horizontal or at any angle. Of course, the belts according to the invention may be used as well in a horizontal position and also individually for example, as conveyor belts or as conveyor and sealing belts.

The two longitudinal edges of the belt 1 are so enlarged as to form, each, a guiding or positioning bead 6. In the embodiment illustrated in the FIGS. 1 and 2, the enlarged guiding bead 6 of each longitudinal edge of the belt 1 is obtained by incorporating into the respective edge of the belt 1 a flexible and tension-resistant core 5. For this purpose, the corresponding marginal portion 101 of each longitudinal edge is folded around the core 5 and is secured to the belt 1 in any suitable manner, particularly by stitching and/or glueing and/or sealing. The core 5 of the enlarged bead 6 of each longitudinal edge of the belt 1 extends over the entire length of the belt 1 and, preferably, it is also of closed ring configuration similarly to said belt. Said core 5 may be made of any suitable material which - when the marginal portion 101 of the belt 1 is sealed and/or when the belt 1 is subjected to a thermal action such as when it is used as a sealing belt -should also be resistant to said heat. Thus, for example, the core 5 may be constituted by a flexible rod of plastics material or by a small string or cable of natural, mineral or synthetic fibres, particularly of glass or glass fibres.

In a possible modified embodiment, the core 5 may be constituted by a small cable of coiled steel wire, as shown in FIG. 3. This embodiment facilitates the junction of the two ends of the flexible core 5 when it is closed into a ring configuration.

In the embodiment of FIG. 4, the enlarged guiding bead 106 at each longitudinal edge of the belt 1 is obtained by rolling the respective marginal portion of the belt 1 transversely to said belt and by securing the curled bead thus obtained in any suitable manner, for example, by sealing or glueing its turns to each other. Said marginal portion of the belt 1 may be rolled, similarly to the illustrated embodiment, also around a core, e.g. around a wire of any metal or any other suitable material. Said core may remain incorporated within the curl thus obtained, or it may be unthreaded therefrom, e.g. after its consolidation, thus forming an enlarged tubular curl-shaped bead.

The width of the belt 1 is selected depending upon the length of the turn-round cylinders 2, 3 so that the belt 1 will rest with its enlarged guiding beads 6 or 106 or both its longitudinal edges against the beveled edges 4 of the respective end surfaces of said turn-round cylinders 2, 3, as shown particularly in the FIGS. 2 and 4. The belt 1 is thus effectively prevented from displacing transversely, i.e. from displacing in the axial direction of the leading cylinders 2, 3, and the belt 1 will be maintained stretched and straight also in its transverse direction.

Instead of resting against the end edges 4 of the turn-round cylinders 2, 3, the enlarged guiding beads 6, 106 of the longitudinal edges of the belt 1 may rest against corresponding annular steps formed peripherally on the turn-round cylinders 2, 3 or they may engage into corresponding annular grooves formed in said guiding cylinders 2, 3. In a further possible embodiment, each guiding cylinder 2, 3 is formed on at least one and possibly on both ends thereof with two or more peripheral annular grooves so that it can be used with belts 1 of different width, each of which is engaged by means of the enlarged guiding bead of its longitudinal edges in one of the two or more corresponding annular grooves or on a step or on the edge of the respective end surface of the cylinder. This provision permits to use belts of different widths on the same turn-round and/or driving cylinders.

I claim:

1. An endless belt (1) carried around at least two turn-round and/or driving cylinders (2, 3) having spaced apart bead engaging surfaces and made of plastics material, particularly of polytetrafluoroethylene (PTFE, TFE), or the like, or made of a fabric of natural, mineral or synthetic fibres, particularly of glass, or the like, impregnated and/or coated with plastics material, particularly with polytetrafluoroethylene (PTFE, TFE), or the like, characterized in that:
   a tubular cavity is provided along each longitudinal edge;
   an endless flexible core is provided in each respective said cavity whereby an enlarged guide bead is formed at each longitudinal edge, said flexible core being freely slidable in the respective said cavity; and
   a width of said belt between said guide beads matches a distance between the bead engaging surfaces such that respective said guide beads engage respective said bead engaging surfaces to maintain said endless belt in position between said cylinders.

2. A belt according to claim 1, characterized in that said turn-round and/or driving cylinders (2, 3) are formed with at least two axially spaced annular steps or annular grooves forming the bead engaging surfaces, so that the enlarged guiding beads (6, 106) of the two longitudinal edges of the web will rest each against a step or will engage each into a groove in said cylinders.

3. A belt according to the claim 1, characterized in that said core (5) is made of a material capable of resisting the tension and heat to which the belt (1) is subjected, and is constituted by a flexible rod of plastics, by a small string or cable of natural, mineral or synthetic fibres, particularly of glass, or the like.

4. A belt according to claim 1, characterized in that said core (5) comprises one or more steel wires, particularly one coiled steel wire.

5. A belt according to claim 1, characterized in that the marginal portion (101) of at least one longitudinal edge of the belt (1) is folded around the respective core (5) and is secured to said belt (1), for example, by stitching, and/or glueing, and/or sealing.

6. A web according to claim 1, characterized in that the enlarged guiding bead (6, 106) of one of the longitudinal edges of the belt (1) rests on an annular step of the turn-round and/or the driving clyinder (2, 3) or on the edge of an end surface thereof forming one bead engaging surface, while the enlarged guiding bead (6, 106) of the other longitudinal edge of the belt (1) engages into an annular groove of the cylinder (2, 3) forming another bead engaging surface.

7. A belt according to claim 1, characterized in that said core (5) may be threaded, either before or after closing the belt (1) into ring-shape, into a respective tubular recess formed along the corresponding longitudinal edge of the belt (1), and it may be, also unthreaded therefrom.

8. A belt according to claim 1, characterized in that the marginal portion of at least one longitudinal edge of the belt (1) is rolled transversely of said belt (1) so as to obtain a curl constituting said tubular cavity and fixed, for example, by either glueing or sealing.

* * * * *